(12) United States Patent
Benhammadi

(10) Patent No.: US 12,008,244 B2
(45) Date of Patent: Jun. 11, 2024

(54) SECURE NON-VOLATILE MEMORY

(71) Applicant: STMicroelectronics (Alps) SAS, Grenoble (FR)

(72) Inventor: Jawad Benhammadi, Pont de Claix (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 196 days.

(21) Appl. No.: 17/810,093

(22) Filed: Jun. 30, 2022

(65) Prior Publication Data
US 2023/0244413 A1 Aug. 3, 2023

(30) Foreign Application Priority Data

Jan. 31, 2022 (FR) ...................................... 2200857

(51) Int. Cl.
*G06F 3/06* (2006.01)
(52) U.S. Cl.
CPC .......... *G06F 3/0619* (2013.01); *G06F 3/0655* (2013.01); *G06F 3/0679* (2013.01)
(58) Field of Classification Search
CPC .... G06F 3/0655; G06F 3/0619; G06F 3/0679; G06F 21/79; G06F 11/1048
See application file for complete search history.

(56) References Cited

U.S. PATENT DOCUMENTS

| 10,733,291 | B1 | 8/2020 | McLeod | |
|---|---|---|---|---|
| 2005/0213603 | A1* | 9/2005 | Karighattam | H04L 49/90 370/466 |
| 2007/0226795 | A1* | 9/2007 | Conti | G06F 21/554 726/22 |
| 2010/0250497 | A1* | 9/2010 | Redlich | G06Q 10/06 707/661 |
| 2019/0028282 | A1 | 1/2019 | Sharifi et al. | |

* cited by examiner

*Primary Examiner* — Shelly A Chase
*Assistant Examiner* — Enam Ahmed
(74) *Attorney, Agent, or Firm* — Slater Matsil, LLP

(57) ABSTRACT

The present description concerns a method comprising: the loading, from a non-volatile memory of a circuit to a computation circuit, of a first security parameter of the circuit and of a first error-correcting code stored in association with the first security parameter; the verification, by the computation circuit, of the first security parameter and of the first error-correcting code to determine whether one or a plurality of the bits of the security parameter are erroneous; and if it is determined that two bits of the security parameter are erroneous, the loading of a default value of the first parameter into a register.

23 Claims, 3 Drawing Sheets

SECURE NON-VOLATILE MEMORY

CROSS-REFERENCE TO RELATED APPLICATIONS

This application claims priority to French Application No. 2200857, filed on Jan. 31, 2022, which application is hereby incorporated by reference herein in its entirety.

TECHNICAL FIELD

The present disclosure generally relates to electronic circuit security, and in particular embodiments, to a secure non-volatile memory.

BACKGROUND

Non-volatile memory, such as a FLASH-type memory, can store data critical in terms of confidentiality and security, such as cipher keys, security parameters, or the like. The boot sequence of an electronic circuit is a critical step in terms of security, since it generally implies the processing of critical data.

Although there exist solutions to make critical data immutable, it would be desirable to further protect data when loaded from the non-volatile memory into other memories.

SUMMARY

There is a need to improve methods for protecting the confidentiality and/or the security of the content of a non-volatile memory of an electronic device. An embodiment overcomes all or part of the disadvantages of known protection methods.

An embodiment provides a method comprising the loading, from a non-volatile memory of a circuit to a computation circuit, of a first security parameter of the circuit and of a first error-correcting code stored in association with the first security parameter; the verification, by the computation circuit, of the first security parameter and of the first error-correcting code to determine whether one or a plurality of the bits of the security parameter are erroneous; and if it is determined that two bits of the security parameter are erroneous, the loading of a default value of the first parameter into a register.

According to an embodiment, the default value corresponds to a value imposing to the circuit a secure operating state.

According to an embodiment, the above method includes, if it is determined that two bits of the security parameter are erroneous, the transmission of an output signal from an interface of the non-volatile memory to a circuit for controlling the circuit, and the execution of one or a plurality of countermeasures by the control circuit.

According to an embodiment, the control circuit is configured to increment a counter as a consequence of the reception of the output signal and to reset the circuit when a threshold value is reached by the counter.

According to an embodiment, the above method includes, if it is determined that two bits of the security parameter are erroneous, the execution by the interface of the memory of one or a plurality of countermeasures.

According to an embodiment, the above method includes: the reception, by the interface of the non-volatile memory, of a first control signal, the first control signal being formed of m bits, capable of taking $2^m$ different values, only q values among these $2^m$ values being authorized, each of these q values being different from the others by at least two-bit values, where m is greater than or equal to 2 and q is smaller than or equal to $2^m/2$; the comparison of the value of the first control signal, by the interface of the non-volatile memory, with each of the q authorized values; and if the value of the first control signal corresponds to none of the q authorized values, the execution of one or a plurality of countermeasures, for example, comprising the transmission of the output signal by the interface of the memory to the circuit for controlling the circuit.

According to an embodiment, the above method further includes the reception by the interface of the non-volatile memory, from the circuit for controlling the circuit, of a warning input signal indicating the detection of a suspicious event, and the execution by the interface of one or a plurality of countermeasures.

According to an embodiment, the one or plurality of countermeasures includes banning access to a first area of the non-volatile memory due to the reception of the warning input signal.

According to an embodiment, the first area of the non-volatile memory contains at least one cipher key.

According to an embodiment, the one or plurality of countermeasures includes replacing the value of a cipher key stored in the non-volatile memory with a dummy value.

According to an embodiment, the loading into the register of the first security parameter of the circuit is performed before the end of a circuit boot sequence.

According to an embodiment, the non-volatile memory is a FLASH-type memory.

An embodiment provides a circuit that includes a non-volatile memory storing a first security parameter and a first error-correcting code, stored in association with the first parameter in the non-volatile memory; and a computation circuit configured to verify the first security parameter and the first error-correcting code to determine whether one or a plurality of the bits of the security parameter is erroneous; and if it is determined that two bits of the security parameter are erroneous, load a default value of the first security parameter into a register.

According to an embodiment, the above circuit includes an interface of the non-volatile memory configured to, when it is determined that two bits of the security parameter are erroneous, transmit an output signal to a circuit for controlling the circuit configured to execute one or a plurality of countermeasures.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Like features have been designated by like references in the various figures. In particular, the common structural or functional features among the various embodiments may have the same references and may dispose identical structural, dimensional, and material properties.

For clarity, only the steps and elements that are useful for an understanding of the embodiments described herein have been illustrated and described in detail. In particular, the design of the processing devices is well known by those skilled in the art, and certain elements have not been detailed in the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

In the present disclosure, the term "suspicious event" is used to designate an alteration of the value of one or a plurality of signals transmitted in an integrated circuit or of one or a plurality of data stored in a volatile or non-volatile memory of an integrated circuit, of unknown origin. This alteration is, for example, caused by an attack against the integrated circuit, for example, by a fault injection attack, or is caused by another error source, such as the circuit environment, for example, by the radiation effect.

Figure 1:
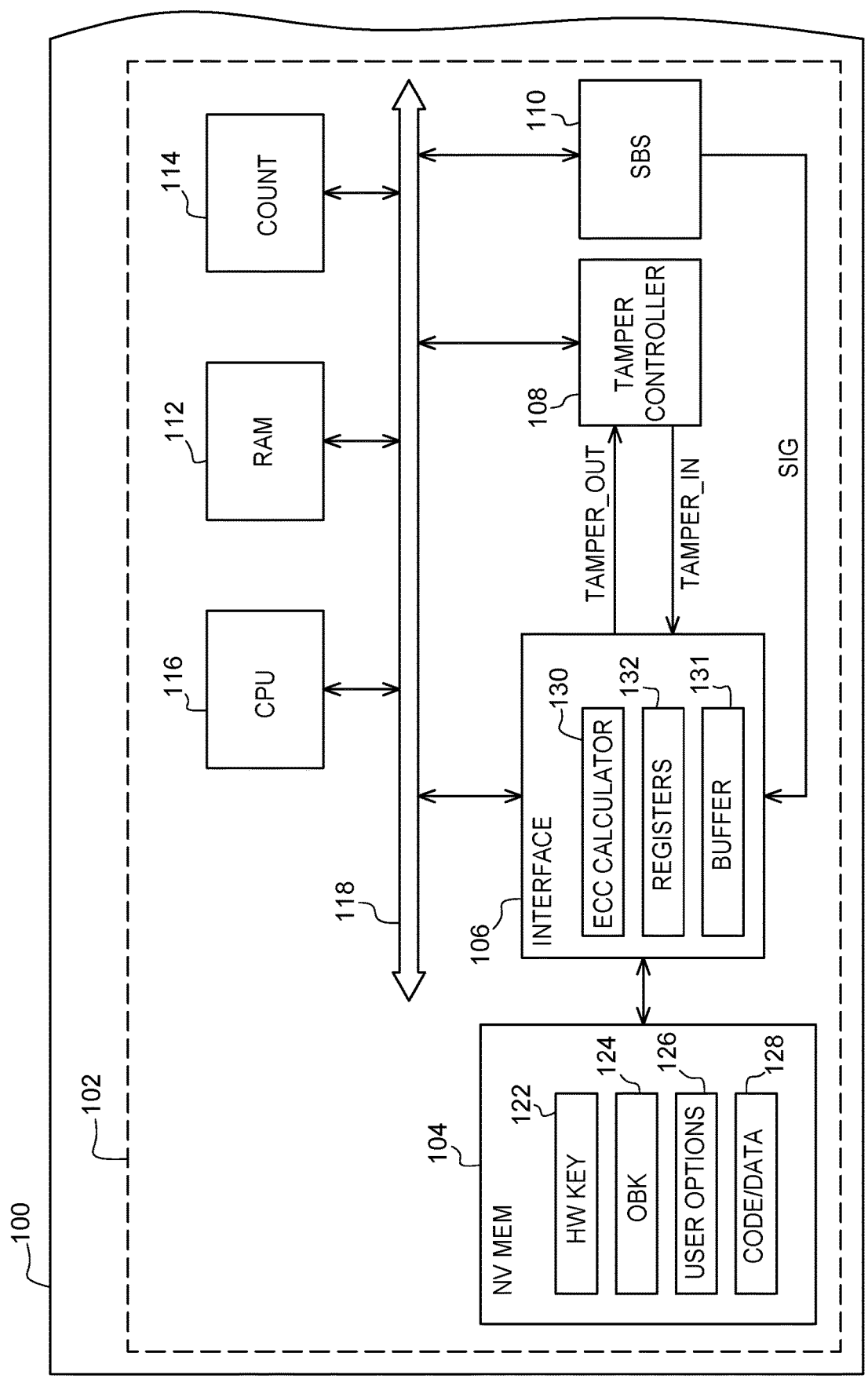
FIG. 1 very schematically shows in the form of blocks an embodiment of an electronic device according to an embodiment of the present disclosure.

FIG. 1 very schematically shows in the form of blocks an electronic device boo comprising an integrated circuit 102 according to an embodiment of the present disclosure.

Electronic device boo is, for example, an electronic board such as a microcircuit card, computer equipment, a microprocessor circuit, etc.

In embodimens, the integrated circuit 102 includes a non-volatile memory 104 (NV MEM), for example, a FLASH memory. Memory 104 is coupled to a memory interface 106 (INTERFACE) itself coupled to a circuit 108 (TAMPER CONTROLLER) for controlling integrated circuit 102, as well as to a circuit 110 (SBS) of integrated circuit 102. As an example, circuit no is a circuit for configuring the booting and the security ("System configuration, Boot and Security") of integrated circuit 102. Circuit 110 is, for example, configured to transmit one or a plurality of signals SIG to interface 106. For example, the signals are control signals transmitted by circuit 110, for example, at the booting of device 100, to inform non-volatile memory 104 of the functionalities or resources of circuit 102 being accessible during the ongoing boot step.

Circuit 102, for example, further includes a volatile memory 112 (RAM), a counter 114 (COUNT) such as, for example, a monotonous counter, and a generic processor 116 (CPU). Processor 116, volatile memory 112, and counter 114 are, for example, coupled to memory interface 106, to control circuit 108, and to circuit no by a bus 118, for example, having a data bus.

Non-volatile memory 104 further includes an area 122 storing a cipher key (HW KEY), an area 124 storing other cipher keys such as Option Bytes Keys (OBK), and an area 126 storing configuration data (USER OPTIONS) such as, for example, security parameters of circuit 102 selected by the user to be used during a boot sequence of device 100. Area 126 further includes, for at least some of the data values that it contains, an error-correcting code (ECC). Each error-correcting code is stored in area 126 in association with a corresponding one of the data values. The combination of each data value with the associated error-correcting code forms a data coding comprising coding redundancy. It then enables to detect, and in some instances correct, one or a plurality of errors in the data value occurring during or after its recording. For example, the error-correcting code enables to detect or to correct one or a plurality of errors occurring during transmission of the data between non-volatile memory 104 and control circuit 108.

In an embodiment, area 128 of non-volatile memory 104 stores codes or data 128 (CODE/DATA). For example, area 128 stores boot or application codes.

Memory interface 106 further includes a computation circuit 130 (ECC CALCULATOR) configured to calculate, from a data value stored in area 126, a verification code and compare this verification code with the error-correcting code associated with the data value. In embodiments, memory interface 106 further includes at least one buffer memory 131 (BUFFER) into which are loaded, from area 126, the data value and its associated error-correcting code. Computation circuit 130 is then, for example, configured to perform the calculation of the data value verification code from buffer memory 131 and compare the verification code with the error-correcting code contained in buffer memory 131.

When the calculated verification code corresponds to the error-correcting code, the data value is processed as being integral and is, for example, loaded into one among a plurality of registers 132 (REGISTERS), for example, contained in memory interface 106. This data value represents one or a plurality of security parameters which, for example, modify the behavior of generic processor 116. For example, these security parameters define rules of access to the data stored in non-volatile memory 104, such as the authorization or the forbidding to read or modify these data. In another example, these parameters enable to define the one or plurality of areas of non-volatile memory 104 accessible in read-only mode and the one or plurality of areas of non-volatile memory 104 accessible in a secure mode. Still, in another example, these parameters enable to activate or deactivate one or a plurality of cryptographic circuits (not shown) of integrated circuit 102.

When the calculated verification code differs from the error-correcting code, this indicates that an alteration of at least one bit of the data value has occurred. According to the coding used to generate the error-correcting code and the size of this code concerning the size of the data value, it is also possible to identify the number of erroneous bits up to a certain limit, and to correct one or a plurality of erroneous bits of the data value. In an embodiment, it is possible to detect and correct an erroneous bit in the data value or to detect the presence of at last two erroneous bits in the data value without being able to correct them.

In the applications targeted by the present disclosure, when at least two bits of the data value are determined by computation circuit 130 as being erroneous, it is considered that a suspicious event, such as an attack on non-volatile memory 104, has occurred. In the case of detection of a suspicious event in the described embodiments, the triggering of countermeasures aiming at making integrated circuit 102 secure is provided.

In an embodiment, to make integrated circuit 102 secure, a default value is then stored into at least one of registers 132 to replace the erroneous data value. The default value, for example, corresponds to a value of a security parameter imposing a secure mode to circuit 102, such as a secure boot.

In the described embodiments, the interface 106 of non-volatile memory 104 is configured to transmit a signal (TAMPER_OUT) to control circuit 108 in case of detection of a suspicious event. Control circuit 108 is configured to, for example, as a consequence of the reception of signal TAMPER_OUT, trigger other countermeasures.

In an embodiment, at each reception of signal TAMPER_OUT, control circuit 108 controls the incrementation of counter 114 and as soon as counter 114 reaches a threshold value, control circuit 108 is, for example, configured to reset circuit 102. In embodiments, the threshold value is between 3 and 10.

Control circuit 108 is further configured to transmit a warning signal (TAMPER_IN) to interface 106 of non-volatile memory 104 when a suspicious event is detected outside of non-volatile memory 104. As a consequence of the reception of signal TAMPER_IN, interface 106 is, for example, configured to trigger countermeasures aiming at protecting the confidentiality of the content of memory 104 and, in particular, of the content of areas 122 to 128.

Figure 2:
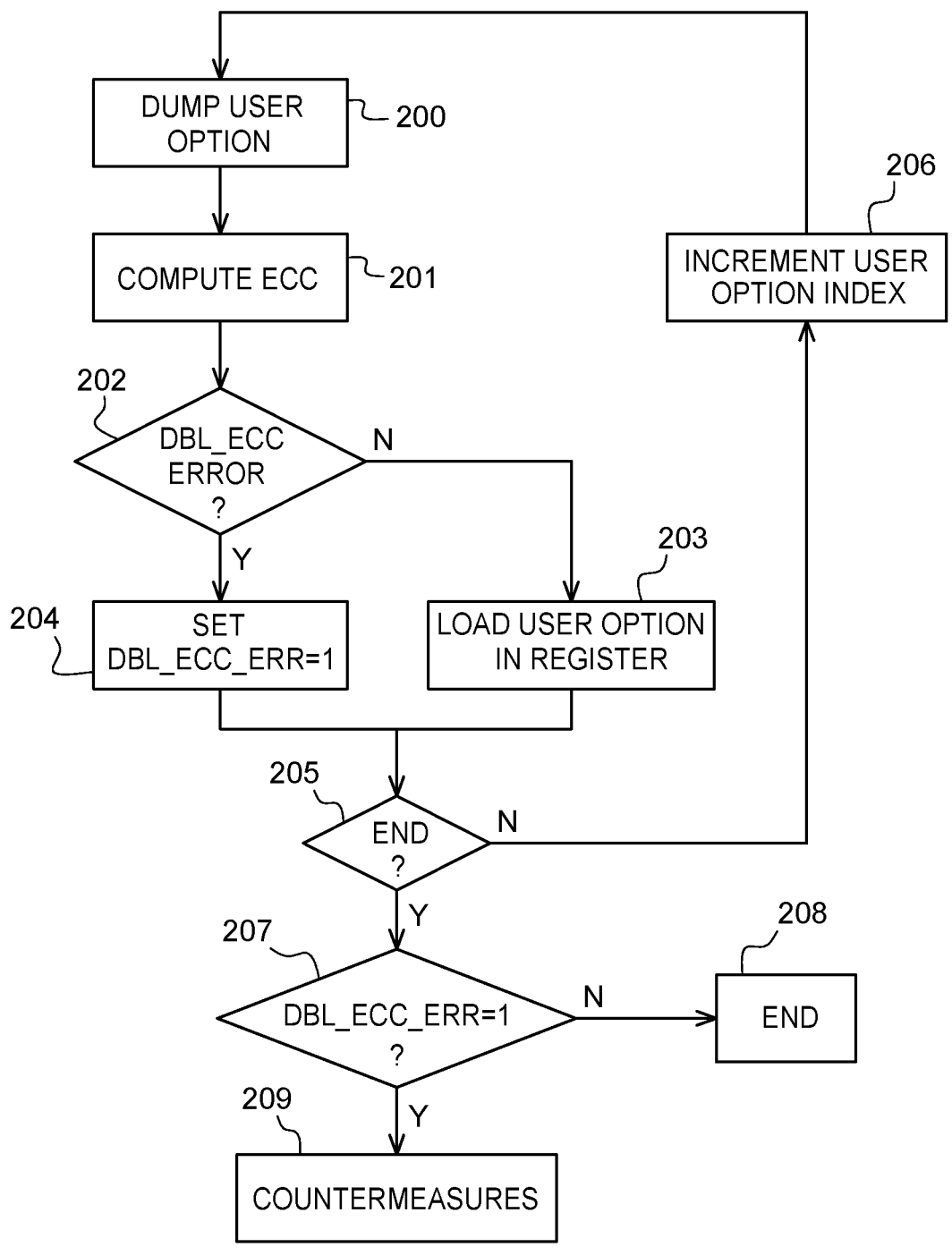
FIG. 2 is a flowchart showing operations of a circuit protection method according to an embodiment of the present disclosure.

FIG. 2 is a flowchart showing operations of a method of protecting the integrated circuit 102 of FIG. 1 according to an embodiment of the present disclosure. The steps of the method of FIG. 2 are implemented, for example, by non-volatile memory 104 and memory interface 106, under control of the generic processor 116.

At step 200 (DUMP USER OPTION), a data value, for example, contained in area 126 of the non-volatile memory 104 of FIG. 1, as well as the associated error-correcting code, are, for example, loaded into the buffer memory 131 of computation circuit 130.

In embodiments, in the case where there is a plurality of data values to be processed in area 126, these values can be associated with corresponding index values or memory addresses. The data value and the error-correcting code loaded at step 200, for example, correspond to those associated with a current value of the index or of the memory address.

At step 201 (COMPUTE ECC), computation circuit 130 calculates a verification code from the data value. The verification code is, for example, calculated according to the same algorithm as that used for the calculation of the error-correcting code associated with the data value and stored in association with the data value.

In embodiments, before recording the data value in area 126, the error-correcting code has been calculated, by circuit 130 or by another circuit, so that the data value and the associated error-correcting code are recorded at the same time in area 126. Computation circuit 130 is further configured to compare the verification code with the error-correcting code associated with the data value.

At step 202 (DBL_ECC ERROR?), computation circuit 130 determines, based on the comparison between the verification code and the error-correcting code, whether at least two bits of the data value loaded at step 200 are erroneous.

In the case where computation circuit 130 determines that less than two bits of the data value are erroneous (branch N), the method continues at step 203 (LOAD USER OPTION IN REGISTER), where the data value is, for example, loaded into at least one of registers 132.

In the case where a bit of the data value is erroneous, computation circuit 130 is, for example, configured to correct this bit before loading the data value into the at least one of registers 132. It would also be possible, instead of loading the data value into at least one of registers 132, for the data value to be loaded into at least one storage element of circuit 102, such as, for example, volatile memory 112 or a register distinct from registers 132 (not illustrated in FIG. 1).

In the case where computation circuit 130 determines, during step 202, that a double error has occurred (branch Y), that is, at least two bits of the data value are erroneous, the method carries on at step 204 (SET DBL_ECC_ERR=1). During step 204, a value, for example, value 1, is assigned to a variable DBL_ECC_ERR, which is, for example, initially at 0. Variable DBL_ECC_ERR is, for example, stored in one of registers 132, and its state indicates whether a data value loaded during step 200 has been detected as having at least two erroneous bits.

In an embodiment, when variable DBL_ECC_ERR has a state 0, this indicates that no double error has been detected on the previously processed data values. When variable DBL_ECC_ERR has as state 1, this indicates that at least one of the data values, loaded during an implementation of step 200, exhibits a double error and, in this case, that a suspicious event has occurred. Values 0 and 1 are provided as an example and are, of course, not limiting.

After the implementation of step 203 or possibly of step 204, the method carries on at a step 205 (END?) where it is determined, for example, by generic processor 116, whether another data value stored in area 126 is to be loaded, in association with an error-correcting code, into buffer memory 131. If it is determined that there remains at least one data value to be loaded (branch N), the method carries on at step 206 (INCREMENT USER OPTION INDEX). As an example, during the implementation of step 206, the memory address of the new data value to be loaded is determined, for example, by generic processor 116 and is transmitted to non-volatile memory 104. The method then resumes at step 200. The new data value to be loaded is, for example, determined by incrementing the current index value.

In the case where, at step 205, it is determined that there is no further data value to be loaded (branch Y), the method carries on at step 207 (DBL_ECC_ERR=1?) where the state of variable DBL_ECC_ERR is verified, for example, by generic processor 116. When the state of variable DBL_ECC_ERR indicates that no double error has been detected (branch N), for example, when the variable is equal to 0, the method ends on step 208 (END). In an embodiment, after step 208, the data values are used by integrated circuit 102 in a boot sequence.

In the case where, during the implementation of step 207, it is determined that a double error has been detected (branch Y) and accordingly that a suspicious event has occurred, the method continues at step 209 (COUNTERMEASURES). Step 209 includes executing one or a plurality of countermeasures ensuring the protection of circuit 102.

According to an embodiment, a countermeasure executed in case of detection of a suspicious event includes loading default values into at least one of registers 132 to replace the data values. The default values, for example, correspond to values ensuring a secure boot or operation of circuit 102. As an example, the default values enable restricting access to non-volatile memory 104.

According to an embodiment, another countermeasure executed in case of detection of a suspicious event includes replacing the value of the cipher key HW KEY stored in area 122 with a dummy value. Cipher key HW KEY will then be impossible to use since its value will not enable to perform the deciphering of the concerned data.

According to an embodiment, another countermeasure executed in case of a suspicious event detection includes blocking access to the area 124 storing cipher keys OBK.

According to an embodiment, another countermeasure executed in case of a suspicious event detection includes transmitting, via the interface 106 of non-volatile memory 104 and to the control circuit 108 of integrated circuit 102, signal TAMPER_OUT.

In embodiments, control circuit 108 is configured to control the incrementation of counter 114 due to the reception of signal TAMPER_OUT. Generic processor 116 is, for example, configured to trigger a resetting of integrated circuit 102 when the counter reaches a certain threshold value.

Although in the example of FIGS. 1 and 2, the verification code is calculated in the interface 106 of volatile memory 104, in other embodiments, the data value and the associated error-correcting code are loaded into a register outside of memory interface 106 and non-volatile memory 104, for example, into a register (not illustrated in FIG. 1) included in processor 116. In embodiments, the calculation of the verification code and the comparison with the error-correcting code are then performed outside of non-volatile memory 104.

Although, in the example of FIGS. 1 and 2, the error-correcting code is used to detect suspicious events, additionally or alternately, it would also be possible to detect suspicious elements with volatile memory 104 based on other means. An example, based on control signals SIG, is now described in relation with FIG. 3.

Figure 3:
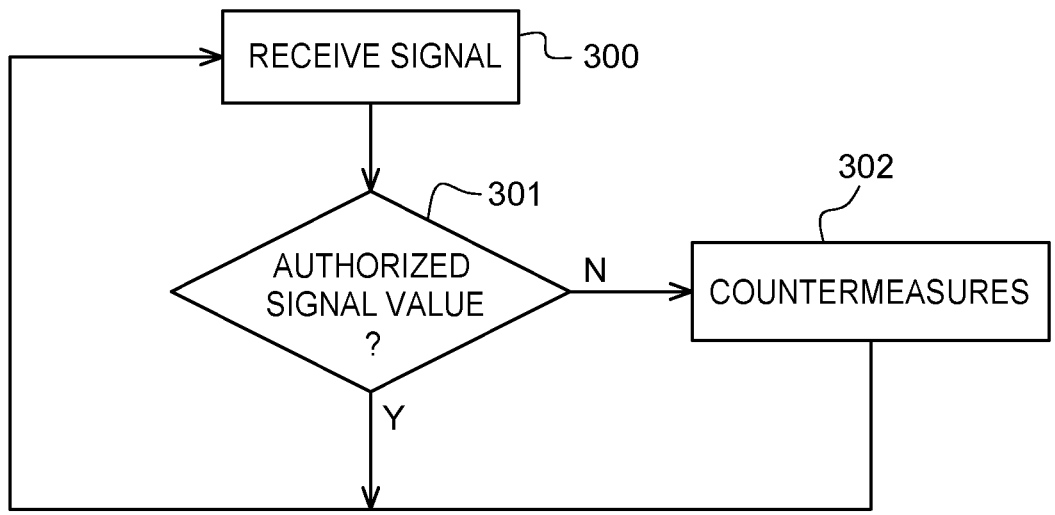
FIG. 3 is a flowchart showing operations of a circuit protection method according to another embodiment of the present disclosure.

FIG. 3 is a flowchart showing operations of a method of protection of the circuit 102 of FIG. 1 according to another embodiment of the present disclosure. The steps of the method of FIG. 3 are implemented, for example, by non-volatile memory 104 and memory interface 106, under control of a generic processor 116.

At step 300 (RECEIVE SIGNAL), circuit no sends one among the control signals SIG to the interface 106 of non-volatile memory 104.

For example, the transmitted control signal enables non-volatile memory 104 whether certain functionalities of integrated circuit 102 are activated or whether certain resources of integrated circuit 102 are accessible. In another example, the transmitted control signal SIG indicates to non-volatile memory 104 which memory areas forming it, for example, which areas among areas partitioning area 128, should be accessible or inaccessible to writing or reading. For example, a control signal SIG of this type is transmitted to non-volatile memory 104 at each step of a boot sequence, enabling progressively lock or unlock of non-volatile memory 104.

According to an embodiment of the present disclosure, the control signals are coded over a number m of bits, where m is an integer, for example, in the range from 4 to 16. In particular, number m enables to add redundancy in the coding of a control signal by coding it over more bits than necessary. More particularly, of the $2^m$ possible control values, only a number q, smaller than or equal to $2^m/2$, of values correspond to a valid and authorized control signal value. In other words, each valid and authorized control signal value differs from each other valid and authorized control signal value by at least two bits. When a valid and authorized control signal value is modified by a suspicious event, the values of at least two bits among the m bits coding this signal should thus be modified so that the modified signal value corresponds to another valid and authorized value of the control signal. As an example, the valid and authorized control signal values are stored in a list or table, stored, for example, in non-volatile memory 104 or by another memory of circuit 102.

At step 301 (AUTHORIZED SIGNAL VALUE?), interface 106 verifies whether the value of the control signal is valid and authorized, for example, by comparing it with the values stored in the list or table of valid and authorized signal values. If the received control signal value is valid and authorized (branch Y), the method resumes, for example, at step 300, where interface 106 waits for the reception of a new control signal.

If the value of the control signal received by interface 106 does not correspond to a valid and authorized signal value (branch N), a suspicious event, altering the value of the signal, occurs. The method carries on at step 302 (COUNTERMEASURES), which includes carrying out one or a plurality of countermeasures ensuring the protection of integrated circuit 102. The deployed countermeasures are, for example, the countermeasures described in relation with step 209 of FIG. 2.

Figure 4:
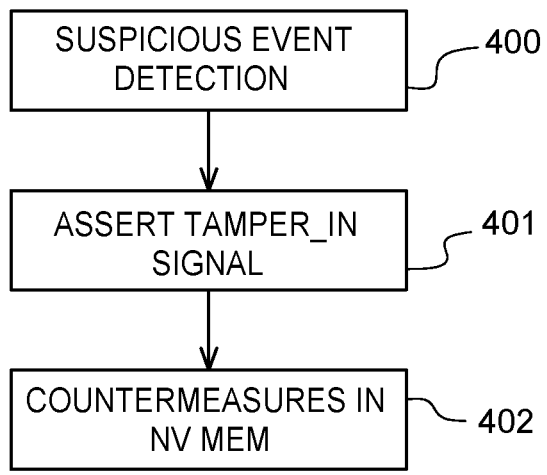
FIG. 4 is a flowchart showing operations of a circuit protection method according to another embodiment of the present disclosure.

FIG. 4 is a flowchart showing operations of a method of protection of circuit 102 according to another embodiment of the present disclosure. The steps of the method of FIG. 4 are implemented, for example, by control circuit 108 and by non-volatile memory 104 and memory interface 106, under control of a generic processor 116.

At step 400 (SUSPICIOUS EVENT DETECTION), a suspicious event is detected by a detection mechanism outside of non-volatile memory 104. For example, the circuit 108 for controlling integrated circuit 102 is configured to detect a suspicious event, for example, occurring on the content of volatile memory 102, on the data being transmitted over bus 118, etc. Those skilled in the art know suspicious event detection mechanisms and, therefore, thse mechanisms will not be described in detail herein.

As a consequence of detecting a suspicious event outside of non-volatile memory 104 and memory interface 106 during step 400, the control circuit 108 is configured to transmit the warning signal TAMPER_IN at step 401 (ASSERT TAMPER_IN SIGNAL) to the interface 106 of non-volatile memory 104. During step 401, control circuit 108 is, for example, further configured to trigger the incrementation of counter 114.

Interface 106 then triggers, at step 402 (COUNTERMEASURES IN NV MEM), countermeasures to protect non-volatile memory 104. The deployed countermeasures are, for example, the countermeasures described in relation with step 209 of FIG. 2 such as the loading of the default values into at least one of registers 132 to replace the data values originating from memory area 126; the replacing of the value of cipher key HW KEY stored in area 122, with a dummy value; or the banning of the access to the area 124 storing cipher keys OBK.

Various embodiments and variants have been described. Those skilled in the art will understand that certain features of these various embodiments and variants may be combined, and other variants will occur to those skilled in the art. For example, other countermeasures than those described may be implemented.

Finally, the practical implementation of the described embodiments and variants is within the abilities of those skilled in the art based on the functional indications given hereabove.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   loading, from a non-volatile memory of a circuit to a computation circuit, a first security parameter of the circuit and a first error-correcting code stored in association with the first security parameter;
   verifying, by the computation circuit, the first security parameter and the first error-correcting code;
   determining whether one or more bits of the first security parameter are erroneous;
   loading the first security parameter into a register in response to determining that none of the bits of the first security parameter is erroneous; and
   loading a default value into the register in response to determining that two bits of the first security parameter are erroneous, the first security parameter and the default value defining access rules to the non-volatile memory.

2. The method of claim 1, wherein the default value corresponds to a value imposing a secure operating state on the circuit.

3. The method of claim 1, further comprising, in response to determining that two bits of the first security parameter are erroneous:
   transmitting an output signal from an interface of the non-volatile memory to a control circuit; and
   executing a countermeasure by the control circuit.

4. The method of claim 3, wherein the countermeasure comprises replacing a value of a cipher key stored in the non-volatile memory with a dummy value.

5. The method of claim 3, further comprising:
   incrementing, by the control circuit, a counter in response to receiving the output signal; and
   resetting the circuit in response to reaching a threshold value by the counter.

6. The method of claim 3, further comprising executing a second countermeasure by the interface in response to determining that two security parameter bits are erroneous.

7. The method of claim 3, further comprising:
   receiving, by the interface, a first control signal formed of m bits, capable of taking $2^m$ different values, wherein only q values among these $2^m$ values are authorized, wherein each of the q values is different by at least two-bit values, wherein m is greater than or equal to 2, and wherein q is smaller than or equal to $2^m/2$;
   comparing, by the interface, a value of the first control signal with each of the q values; and
   executing the countermeasure in response to the value of the first control signal corresponding to none of the q values.

8. The method of claim 7, wherein the executing comprises transmitting the output signal by the interface for controlling the circuit.

9. The method of claim 3, further comprising receiving, by the interface from the circuit, a warning input signal for controlling the circuit, the warning input signal indicating a detection of a suspicious event.

10. The method of claim 9, wherein the countermeasure comprises a ban of access to a first area of the non-volatile memory in response to receiving the warning input signal.

11. The method of claim 10, wherein the first area of the non-volatile memory contains at least one cipher key.

12. The method of claim 1, wherein the loading of the first security parameter is performed before an end of a circuit boot sequence.

13. The method of claim 1, wherein the non-volatile memory is a FLASH-type memory.

14. A circuit, comprising:
   a non-volatile memory configured to store a first security parameter and a first error-correcting code, the first error-correcting code stored in association with the first security parameter; and
   a computation circuit configured to:
      verify the first security parameter and the first error-correcting code;
      determine whether one or more bits of the first security parameter are erroneous;
      load the first security parameter into a register in response to determining that none of the bits of the first security parameter is erroneous; and
      load a default value into the register in response to determining that two bits of the first security parameter are erroneous, the first security parameter and the default value defining access rules to the non-volatile memory.

15. The circuit of claim 14, wherein the circuit further comprises a control circuit configured to execute a countermeasure.

16. The circuit of claim 15, wherein the non-volatile memory comprises an interface, the interface configured to transmit an output signal to the control circuit in response to determining that two bits of the first security parameter are erroneous, the output signal configured to indicate to the control circuit to execute the countermeasure.

17. The circuit of claim 16, wherein the countermeasure comprises replacing a value of a cipher key stored in the non-volatile memory with a dummy value.

18. A device, comprising a circuit, the circuit comprising:
   a non-volatile memory configured to store a first security parameter and a first error-correcting code, the first error-correcting code stored in association with the first security parameter; and a computation circuit configured to:
verify the first security parameter and the first error-correcting code;
determine whether one or more bits of the first security parameter are erroneous;
load the first security parameter into a register in response to determining that none of the bits of the first security parameter is erroneous; and
load a default value into the register in response to determining that two bits of the first security parameter are erroneous, the first security parameter and the default value defining access rules to the non-volatile memory.

19. The device of claim 18, wherein the circuit further comprises a control circuit configured to execute a countermeasure.

20. The device of claim 19, wherein the non-volatile memory comprises an interface, the interface configured to transmit an output signal to the control circuit in response to determining that two bits of the first security parameter are erroneous, the output signal configured to indicate to the control circuit to execute the countermeasure.

21. The device of claim 19, wherein access to an area of the non-volatile memory is authorized in response to the first security parameter being stored in the register, and wherein access to the area of the non-volatile memory is unauthorized in response to the default value being stored in the register.

22. The method of claim 1, wherein access to an area of the non-volatile memory is authorized in response to the first security parameter being stored in the register, and wherein access to the area of the non-volatile memory is unauthorized in response to the default value being stored in the register.

23. The circuit of claim 14, wherein access to an area of the non-volatile memory is authorized in response to the first security parameter being stored in the register, and wherein access to the area of the non-volatile memory is unauthorized in response to the default value being stored in the register.

* * * * *